US00RE33967E

United States Patent [19]

Honda et al.

[11] E Patent Number: Re. 33,967

[45] Reissued Date of Patent: Jun. 23, 1992

[54] VALVE ACTUATING MECHANISM HAVING STOPPING FUNCTION FOR INTERNAL COMBUSTION ENGINES

[75] Inventors: Shoichi Honda, Tokyo; Yoshikatsu Nakano, Kawagoe; Makoto Hirano, Asaka; Masaaki Matsuura, Tokyo, all of Japan

[73] Assignee: Honda Giken Kogyo Kabushiki Kaisha, Tokyo, Japan

[21] Appl. No.: 346,343

[22] Filed: Apr. 28, 1989

Related U.S. Patent Documents

Reissue of:

[64] Patent No.: 4,537,165
Issued: Aug. 27, 1985
Appl. No.: 591,145
Filed: Mar. 19, 1984

U.S. Applications:

[63] Continuation of Ser. No. 89,727, Aug. 26, 1987, abandoned.

[30] Foreign Application Priority Data

Jun. 13, 1983 [JP] Japan ..... 58-100505
Jun. 13, 1983 [JP] Japan ..... 58-105458
Jun. 13, 1983 [JP] Japan ..... 58-105459

[51] Int. Cl.[5] ..... F01L 1/34; F01L 1/26

[52] U.S. Cl. ..... 123/90.16; 123/90.27; 123/90.46; 123/308; 123/315; 123/432

[58] Field of Search ..... 123/90.16, 90.27, 90.46, 123/308, 315, 432, 198 F

[56] References Cited

U.S. PATENT DOCUMENTS 4,253,434 3/1981 Takizawa et al. ..... 123/90.16
4,285,310 8/1981 Takizawa et al. ..... 123/90.16
4,353,334 10/1982 Neitz ..... 123/90.16
4,354,460 10/1982 Mae et al. ..... 123/90.16
4,404,937 9/1983 Leitermann ..... 123/90.16
4,423,709 1/1984 Arrieta ..... 123/198 F
4,442,806 4/1984 Matsuura ..... 123/90.16
4,469,061 9/1984 Ajiki et al. ..... 123/90.16
4,480,617 11/1984 Nakano et al. ..... 123/90.16

*Primary Examiner*—E. Rollins-Cross
*Assistant Examiner*—M. Macy
*Attorney, Agent, or Firm*—Lyon & Lyon

[57] ABSTRACT

Herein disclosed is a valve actuating mechanism having a stopping function for use in an internal combustion engine of the type, in which at least one pair of intake or exhaust valves having an identical function and disposed adjacent to each other are arranged for one cylinder. First and second rocker arms respectively having arms abutting against the upper ends of the paired intake or exhaust valves are rockingly supported on a common support shaft which is fixed on the engine body while having an axis perpendicular to the operating directions of the valves. The first rocker arm is formed with a cylinder bore which is opened toward the second rocker arm to bear a plunger therein whereas the second rocker arm is formed with a guide bore which is opened toward the first rocker arm to fit the plunger therein. A hydraulic actuation chamber defined between the bottom portion of the cylinder bore and the rear end of the plunger is connected with an oil-pressure source through a hydraulic change-over valve for changing the supply and stop of the oil pressure to the actuation chamber. Either of the first or second rocker arm is formed with a cam slipper for sliding contact with a cam which is adapted to rotate in accordance with the run of the engine.

30 Claims, 9 Drawing Sheets

VALVE ACTUATING MECHANISM HAVING STOPPING FUNCTION FOR INTERNAL COMBUSTION ENGINES

Matter enclosed in heavy brackets [ ] appears in the original patent but forms no part of this reissue specification; matter printed in italics indicates the additions made by reissue.

*This application is a reissue continuation of reissue application Ser. No. 089,727, filed Aug. 26, 1987, now abandoned.*

BACKGROUND OF THE INVENTION

1. Field of the Invention

The present invention relates to an internal combustion engine of the type, in which at least one pair of intake or exhaust valves having an identical function and disposed adjacent to each other are arranged for use with one cylinder, and more particularly to a valve actuating mechanism having a stopping function for use in the internal combustion engine of the above type to selectively operate and stop a portion of the intake or exhaust valves in accordance with the r.p.m. of the engine.

2. Description of the Prior Art

In the prior art, there is known a high-speed internal combustion engine which is equipped for one cylinder with a plurality of intake and exhaust valves. If the internal combustion engine of the known type is run such that a portion of the intake and exhaust valves is stopped during a low- or intermediate-load operation whereas all the intake and exhaust valves are run during a high-load operation, a high efficiency can be attained over all the operating range of the engine, and the fuel consumption can be improved. In the prior art, however, there has never been obtained a satisfactory mechanism for solving the above subject.

SUMMARY OF THE INVENTION

The present invention has been conceived in view of the background thus far described and has a first object to provide such a valve actuating mechanism having a stopping function for use in an internal combustion engine as enabling to ensure highly reliable operations and excellent practice by a relatively simple construction.

According to a first feature of the present invention: first and second rocker arms respectively having arms abutting against the upper ends of paired intake or exhaust valves are rockingly supported on a common support shaft which is fixed on the engine body while having an axis perpendicular to the operating directions of the valves; the first rocker arm is formed with a cylinder bore which is opened toward the second rocker arm to bear a plunger therein whereas the second rocker arm is formed with a guide bore which is opened toward the first rocker arm to fit the plunger therein; a hydraulic actuation chamber defined between the bottom portion of the cylinder bore and rear end of the plunger is connected with an oil-pressure source through a hydraulic change-over valve for changing the supply and stop of the oil pressure to the actuation chamber; and either of the first or second rocker arm is formed with a cam slipper for sliding contact with a cam which is adapted to rotate in accordance with the run of the engine.

A reliable changing operation can be conducted by the relatively simple construction described in the above, in which the first and second rocker arms for opening and closing the paired intake or exhaust valves are connected by hydraulically driving the plunger borne in the cylinder bore of the first rocker arm and into the guide bore of the second rocker arm and are released from their connected state by retracting the plunger into the cylinder bore so that either of the first or second rocker arm may be rockingly driven by a cam. Since the plunger acts as a connecting member of the two rocker arms, moreover, the number of the components can be reduced to make the construction compact and to improve the responsiveness. Since the two rocker arms have mechanisms for the connection and release built therein, still moreover, a spare space for arranging those mechanism can be eliminated to make the engine compact. Alternatively, the mechanism of the present invention can be added to the existing internal combustion engine without any large change in design.

It should be noted here that the valve actuating mechanism having the stopping function is desired to have excellent reliability and durability.

In view of this background, therefore, a second object of the present invention is to provide such a valve actuating mechanism having a stopping function for use in an internal combustion engine as is intended to improve the reliability and durability of a driving hydraulic system in addition to the first object of the present invention.

According to a second feature of the present invention: first and second rocker arms respectively having arms abutting against the upper ends of paired intake or exhaust valves are rockingly supported on a common support shaft which is fixed on the engine body while having an axis perpendicular to the operating directions of the valves; the first rocker arm is formed with a cylinder bore which is opened toward the second rocker arm to bear a plunger therein whereas the second rocker arm is formed with a guide bore which is opened toward the first rocker arm to fit the plunger therein; a hydraulic actuation chamber defined between the bottom portion of the cylinder bore and the rear end of the plunger is connected with a hydraulic change-over valve for changing the supply and stop of the oil pressure from an oil-pressure source to the hydraulic actuation chamber through a passage formed in the first rocker arm, an oil supply passage formed concentrically in the support shaft, and a communication passage formed in the support shaft for providing communication between the former two passages; and either of the first or second rocker arm is formed with a cam slipper for sliding contact with a cam which is adapted to rotate in accordance with the run of the engine.

According to the construction described in the above, the following effect can be obtained in addition to that of the first feature of the present invention. Since the rocking first rocker arm itself is formed with the passage for the pressure oil and since this passage has communication with the oil supply passage in the fixed support shaft, any flexible passage to be bent by the rocking motions of the first rocker arm need not be provided to improve the reliability and durability.

Here, if the changes of the operations and stops of the intake valves and the exhaust valves could be simultaneously conducted by the operation of a single changeover valve, the construction could be simplified to reduce the production cost.

Therefore, a third object of the present invention is to provide, in addition to the achievement of the foregoing first and second objects, such a valve actuating mechanism having a stopping function for use in an internal combustion engine, as is enabled to achieve the changes between the operations and stops of the intake valves and the exhaust valves by the changing operation of a single change-over valve thereby to simplify the construction and to reduce the production cost.

In order to achieve the third object, according to a third feature of the present invention: both the first and second rocker arms forming a pair and respectively having arms abutting against the upper ends of the paired intake valves and first and second arms forming a pair and respectively having arms abutting against the upper ends of the paired exhaust valves are rockingly supported, respectively, on a pair of support shafts which are fixed at the intake valve side and at the exhaust valve side of the engine body, respectively, while having axes perpendicular to the operating directions of the respective valves; the first rocker arms are respectively formed with cylinder bores which are opened toward the corresponding second rocker arms to bear plungers therein whereas the second rocker arms are respectively formed with guide bores which are opened toward the corresponding first rocker arms to fit the plungers therein; hydraulic actuation chambers defined between the bottom portions of the cylinder bores and the rear ends of the plungers are connected with a single hydraulic change-over valve for changing the supply and stop of the oil pressure from a single oil-pressure source to the hydraulic actuation chambers through passages formed respectively in the first rocker arms, oil supply passages formed respectively and concentrically in the support shafts, and communication passages formed respectively in the support shafts for providing communications between the former two passages; and either the first rocker arms or second rocker arms are formed with cam slippers for sliding contact with cams which are adapted to rotate in accordance with the run of the engine.

According to this third feature of the present invention, the construction of the second feature is applied to both the intake valves and the exhaust valves, and the supply and stop of the oil pressure are changed by the single hydraulic change-over valve. In addition to the effects of the first and second features of the present invention, the overall construction can be simplified, and the production cost can be accordingly reduced.

BRIEF DESCRIPTION OF THE DRAWINGS

The above and other objects, features and advantages of the present invention will become apparent from the following description taken in connection with the preferred embodiment thereof with reference to the accompanying drawings, in which.

DESCRIPTION OF THE PREFERRED EMBODIMENT

Figure 1:
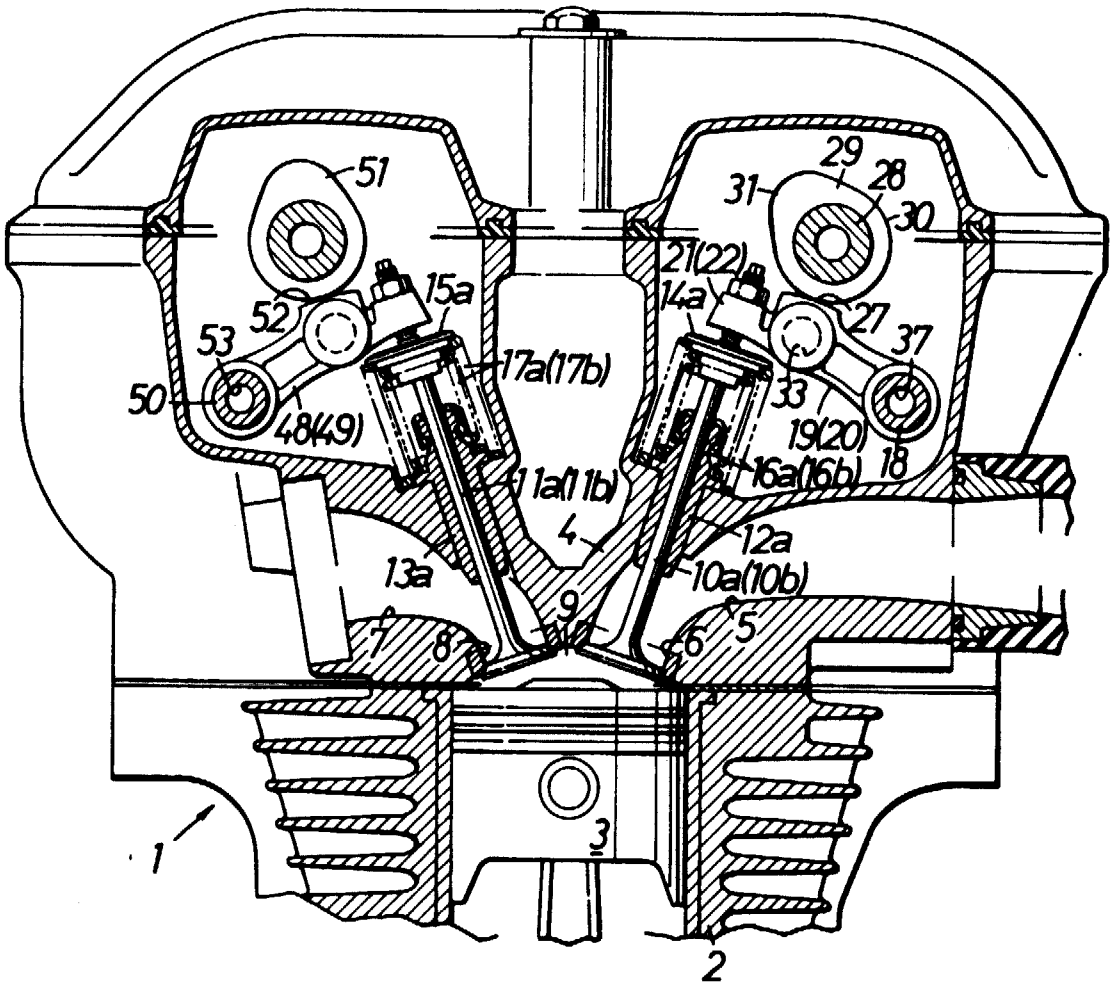
FIG. 1 is a longitudinally sectional side elevation showing the whole construction of one embodiment of the present invention.
Figure 2:
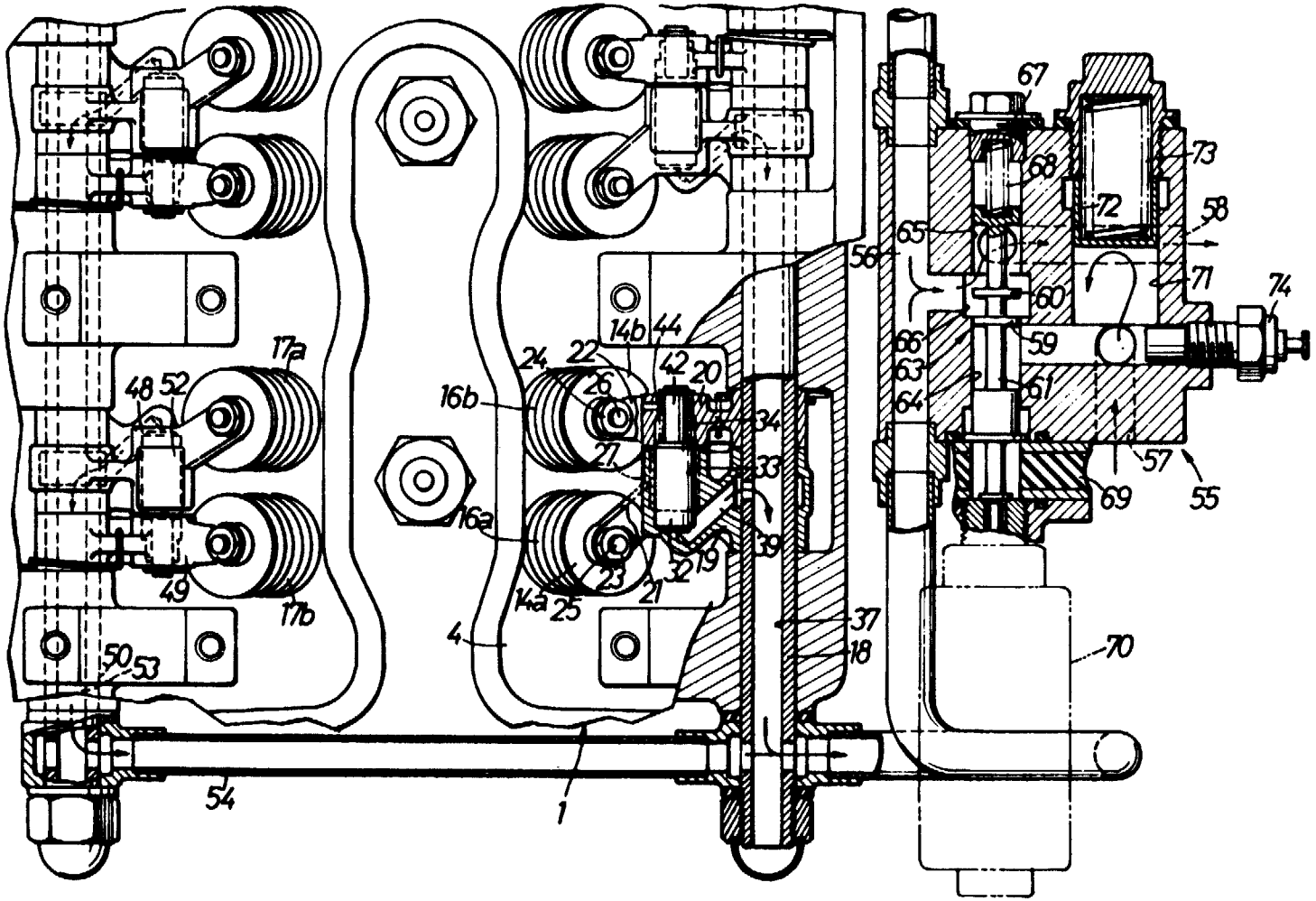
FIG. 2 is a partially cut-away top plan view of FIG. 1.

The present invention will be described in the following in connection with one embodiment thereof with reference to the accompanying drawings. Referring first to FIGS. 1 and 2, pistons 3 are reciprocally movably fitted in the plural cylinders 2 of the body 1 of a multi-cylinder internal combustion engine. In the cylinder head 4 of each cylinder 2, there are formed both a pair of inlets 6, which have respective communications with a plurality of, e.g., a pair of intake ports 5 and which are adjacent to each other, and a pair of outlets 8, which have respective communications with a plurality of e.g., a pair of exhaust ports 7 and which are adjacent to each other, such that the paired inlets 6 and the paired outlets 8 are opened toward a combustion chamber 9.

Intake valves 10a and 10b are arranged in each inlet 6 whereas exhaust valves 11a and 11b are arranged in each outlet 8. As to these valves 10a, 10b, 11a and 11b, one intake valve 10a and one exhaust valve 11a will be described in detail by attaching the suffix "a" with reference to FIG. 1, whereas the other intake valve 10b and exhaust valve 11b will be merely shown in the drawings by attaching the suffix "b" to the corresponding portions.

The intake valve 10a and the exhaust valve 11a are fitted movably in guide sleeves 12a and 13a, which are provided to vertically extend through the cylinder head 4, and are biased to close their inlet 6 and outlet 8 by the actions of retainers 14a and 15a, which are mounted on the upper ends thereof, and valve springs 16a and 17a which are interposed between the cylinder head 4 and the guide sleeves 12a and 13a.

The respective intake valves 10a, 10b and the respective exhaust valves 11a, 11b are selectively changed by mechanism, described below, in accordance with the r.p.m. of the engine between a state in which the two valves 10a and 10b, and 11a and 11b are operative and a state in which only the valves 10a and 11a are operative. The constructions of such mechanisms are absolutely identical for the intake valves 10a and 10b and the exhaust valves 11a and 11b. Therefore, the portions relating to the intake valves 10a and 10b will be first described in the following.

Figure 3:
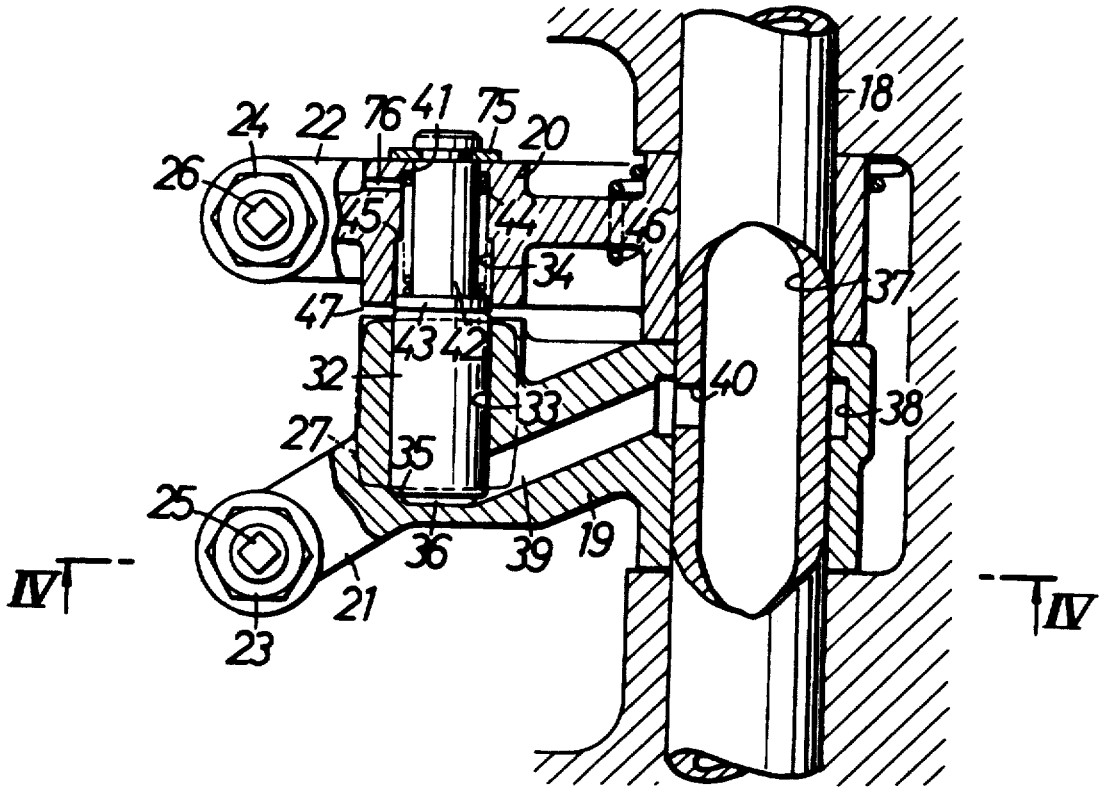
FIG. 3 is an enlarged transverse section showing the essential portions of first and second rocker arms.
Figure 4:
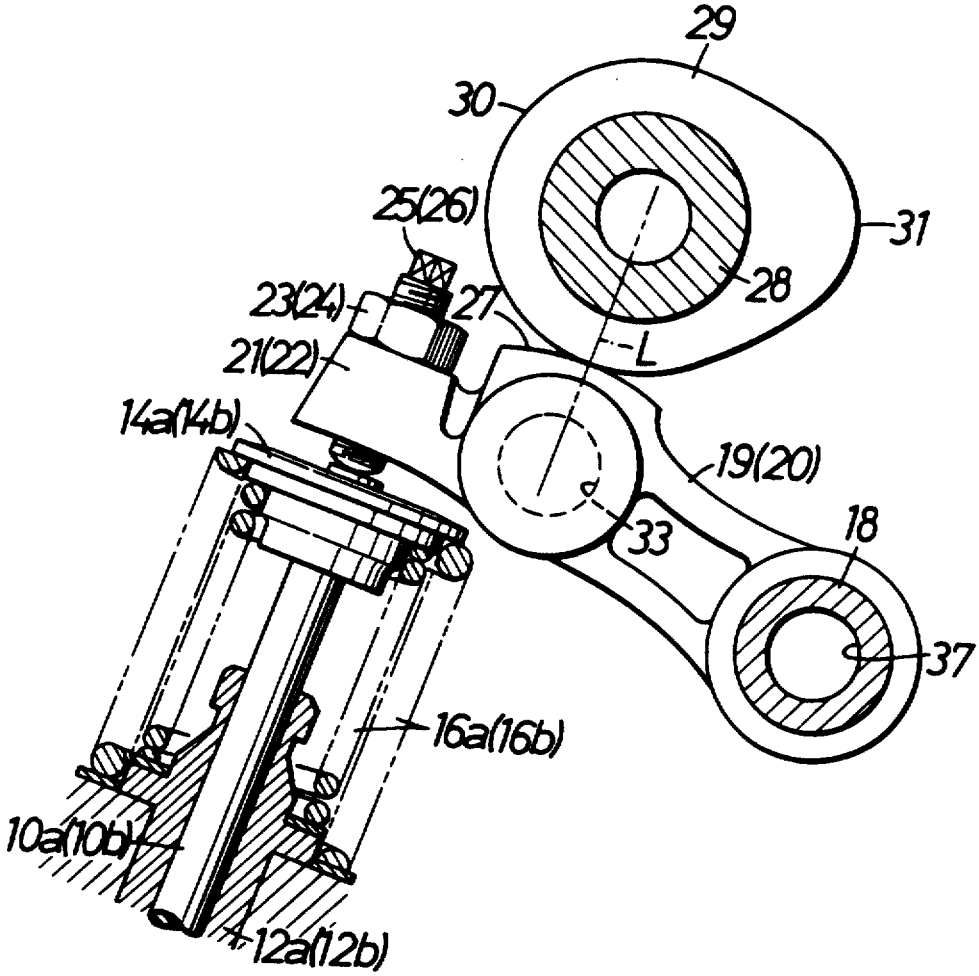
FIG. 4 is a section taken along line IV—IV of FIG. 3.

Referring to FIGS. 3 and 4 together, there is fixedly mounted in an upper portion of the cylinder head 4 a support shaft 18 which extends generally horizontally at a right angle with respect to the operating directions of the intake valves 10 and 10b. On that support shaft 18, there are commonly supported in a rocking manner a first rocker arm 19 and a second rocker arm 20 which are adjacent to to each other. These first and second rocker arms 19 and 20 are formed with arms 21 and 22 which extend to the intake valves 10 and 10b. These arms 21 and 22 are equipped at their leading ends with adjusting screws 25 and 26, respectively, which are fastened on nuts 23 and 24. The leading ends of those adjusting screws 25 and 26 abut against the upper ends of the intake valves 10a and 10b, respectively. As a result, the respective intake valves 10a and 10b are moved down, when they receive axial thrusts from the rocking motions of the first and second rocker arms 19 and 20, against the forces of the valve springs 16a and 16b thereby to open the corresponding inlets 6.

The first rocker arm 19 is formed on its upper face with a cam slipper 27, and there is arranged above the first rocker arm 19 a cam 29 which is fixed on a cam shaft 28 in parallel with the support shaft 18 and which is in sliding contact with the cam slipper 27. That cam 29 is so constructed that it rotates in synchronism with and at one-half of the r.p.m. of the engine. Moreover, the cam 29 has both a lower cam portion 30, which is formed by the circumference of a reference circle, and a higher cam portion 31 which bulges radially outward from the reference circle. As a result, in the state having the higher cam portion 31 slidably contacting with the cam slipper 27, the arm 21 of the first rocker arm 19 is depressed so that the intake valve 10a opens the inlet 6. In the state having the lower cam portion 30 slidably contacting with the cam slipper 27, as shown in FIG. 4, on the contrary, the intake valve 10a is raised by the action of the valve spring 16a thereby to close the inlet 6.

On the other hand, the second rocker arm 20 is not equipped with the drive mechanism such as the aforementioned cam slipper 27 and cam 29. As a result, the second rocker arm 20 operates integrally with the first rocker arm 19, only when it is connected to the first rocker arm 19, and stops its operation in the state that it is disconnected therefrom.

In order to connect or disconnect the two rocker arms 19 and 20, the first rocker arm 19 is formed with a cylinder bore 33 which bears a plunger 32 movably therein and which is opened toward the second rocker arm 20, whereas the second rocker arm 20 is formed in a manner to correspond to the cylinder bore 33 with a bottomed guide bore 34 which is opened toward the first rocker arm 19 and which is allowed to fit the plunger 32 therein. Moreover, the cylinder bore 33 is arranged such that its axis is positioned below the cam slipper 27, in other words, the cam slipper 27 is positioned above the cylinder bore 33. It should be noted that the cam slipper 27 and the cylinder bore 33 are positioned such that the center of the cylinder bore 33, i.e., the center of the plunger 32 falls on a straight line L which joins the center of the cam slipper 27 and the center within the sliding contact range with the cam 29 of the cam shaft 28.

The cylinder bore 33 is formed in the vicinity of its bottom with a stepped portion 35 which can abut against the rear end face of the plunger 32. By the provision of that stepped portion 35, there is always defined a hydraulic actuation chamber 36 between the rear end face of the plunger 32 and the bottom portion of the cylinder bore 33. On the other hand, the support shaft 18 is formed with a concentric oil supply passage 37, and the first rocker arm 19 is formed an annular groove 38 around the support shaft 18 so that the hydraulic actuation chamber 36 and annular groove 38 are allowed to communicate with each other through a passage 39. Moreover, the support shaft 18 is formed with a communication passage 40 for providing communication between the annular groove 38 and oil supply passage 37. As a result, communication is always provided between the hydraulic actuation chamber 36 of the cylinder bore 33 and the oil supply passage 37.

A through hole 41 is formed concentrically in the bottom portion of the guide bore 34 of the second rocker arm 20. Into the guide bore 34, there is inserted through the through hole 41 a guide pin 42 which is to abut against the leading end of the plunger 32. The guide pin 42 is formed at its end portion at the side of the first rocker arm 19 with a disc-shaped abutting flange 43 which is to abut against the whole face of the leading end of the plunger 32. Between the bottom portion of the guide bore 34 and the abutting flange 43, moreover, there is interposed a coil-shaped return spring 44 which is wound on the guide pin 42. As a result, the abutting flange 43 of the guide 42 is elastically biased to abut against the leading end face of the plunger 32 at all times by the force of the return spring 44. On the other hand, a stop collar 75 is fitted on the protruding end portion of the guide pin 42 from the through hole 41.

The guide bore 34 is formed in its midway with a stepper stopper portion 45 which faces the first rocker arm 19. The movement of the guide pin 42 in the direction apart from the first rocker arm 19, i.e., the thrusted movement of the plunger 32 is blocked by the abutment of the abutting flange 43 against the stopper portion 45. On the other hand, the second rocker arm 20 is formed with an air vent hole 76 for venting the vicinity of the bottom portion of the guide hole 34 to the atmosphere. The movement of the guide pin 42, i.e., the plunger 32 are smoothened by releasing or sucking the air through that air vent hole 76.

On the second rocker arm 20, there is wound a set spring 46 for biasing the second rocker arm 20 toward the intake valve 10b by a weaker force than that of the valve spring 16b. As a result, the second rocker arm 20 is not rocked even in its stopped state by the vibrations of the engine and so on but is always held in the position in which the adjusting screw 26 abuts against the upper end of the intake valve 10b.

At both the open end portions of the cylinder bore 33 and the guide bore 34, there is formed between the opposed faces of the first and second rocker arms 19 and 20 a gap 47 which extends in the axial direction of the two bores 33 and 34. In the stopped state of the second rocker arm 20, the abutting positions between the plunger 32 and the abutting flange 43 of the guide pin 42 are located in the gap 47.

Referring to FIG. 2, the constructions of the intake valves 10a and 10b thus far described are similar to those of the exhaust valves 11a and 11b. Specifically, a first rocker arm 48 for driving one exhaust valve 11a and a second rocker arm 49 for driving the other exhaust valve 11b are commonly and rockingly supported on a support shaft 50. The first rocker arm 48 is formed with a cam slipper 52 for slidably contacting with a cam 51. Moreover, the mechanism for connecting or disconnecting the first rocker arm 48 and the second rocker arm 49 is substantially identical to that of the intake valves 10a and 10b, although not shown.

Both the oil supply passage 37 of the support shaft 18 and an oil supply passage 53 of the support shaft 50 are commonly connected to an oil pass pipe 54 which is arranged to extend between the two support shafts 18 and 50. That oil pass pipe 54 is further connected to an hydraulic change-over valve 55 which is arranged in the vicinity of the engine body 1.

The hydraulic change-over valve 55 is a three-port two-position change-over valve, in which the communicating states among a pressure oil distributing passage 56 connected to the oil pass pipe 54, a pressure oil inlet passage 57 and an pressure oil outlet passage 58 are changed by the axial movements of a valve stem 61 equipped with a pair of spool valve members 59 and 60. More specifically, the valve stem 61 is fitted movably in a valve bore 63 which is formed in a valve body 62, and that valve bore 63 is formed with a valve chamber 66 which has a larger diameter than that of left and right valve bore portions 64 and 65 and which always has communication with the pressure oil distributing passage 56. The spool valve members 59 and 60 are fixed on the valve stem 61 at a gap shorter than the axial length of the valve chamber 66. As a result, when one spool valve member 59 shuts off the opened end of the left valve bore portion 64 into the valve chamber 66, the other spool valve member 60 is positioned in the valve chamber 66 to provide communication between the valve chamber 66 and the right valve bore portion 65. When the other spool valve member 60 shuts off the opened end of the right valve bore portion 65 into the valve chamber 66, on the other hand, one spool valve member 59 is positioned in the valve chamber 66 to provide communication between the valve chamber 66 and the left valve bore portion 64.

The end portion of the right valve bore portion 65 at the side opposite to the valve chamber 66 is shut of by means of a cap 67. Between this cap 67 and the right end portion of the valve stem 61, there is interposed a spring 68 which biases the valve stem 61 in the leftward direction, i.e., in a direction to shut off the left valve bore portion 64 with the spool valve member 59. On the other hand, the left end portion of the valve stem 61 is jointed to an actuator 70 which in turn is jointed to the valve body 62 through an insulator 69. That actuator 70 operates, when the detected valve of an engine r.p.m. detecting sensor (not shown) reaches a predetermined value, to move the valve stem 61 against the force of the spring 68 thereby to provide communication of the left valve bore portion 64 with the valve chamber 66.

The left valve bore portion 64 is made to communicate with the pressure oil inlet passage 57, the midway of which has communication with an accumulator chamber 71. A piston 72 fitted in this accumulator chamber 71 is biased by the action of a spring 73 in a direction to contract said accumulator chamber 71 so that the supply of the pressure oil when the left valve bore portion 64 communicates with the valve chamber 66 is promptly conducted. Midway of the pressure oil inlet passage 57, moreover, there is disposed a temperature sensor 74. When the temperature detected by this temperature sensor 74 is below a predetermined level, the actuator 70 is left inoperative irrespective of the signal from the engine r.p.m. detecting sensor. As a result, it is possible to prevent the plunger 32 from being caught by the opened end edge of the guide bore 34 of the second rocker arm 20 to invite the unnecessary motions of the second rocker arm 20 because of the insufficient moving speed of the plunger 32. This insufficient moving speed of the plunger 32 may be caused by the unsmoothness of the movement of the plunger 32 when the pressure oil is cold to have a high viscosity.

The pressure oil inlet passage 57 is connected with an oil pump (although not shown) for feeding a lubricant to the engine, whereas the pressure oil outlet passage 58 is connected with an oil tank (although not shown). By using the lubricating oil pressure, as described in the above, the additional construction can be further simplified more than the mechanism in which a special oil pump is arranged to use a hydraulic system different from the lubricant hydraulic system.

Figure 5:
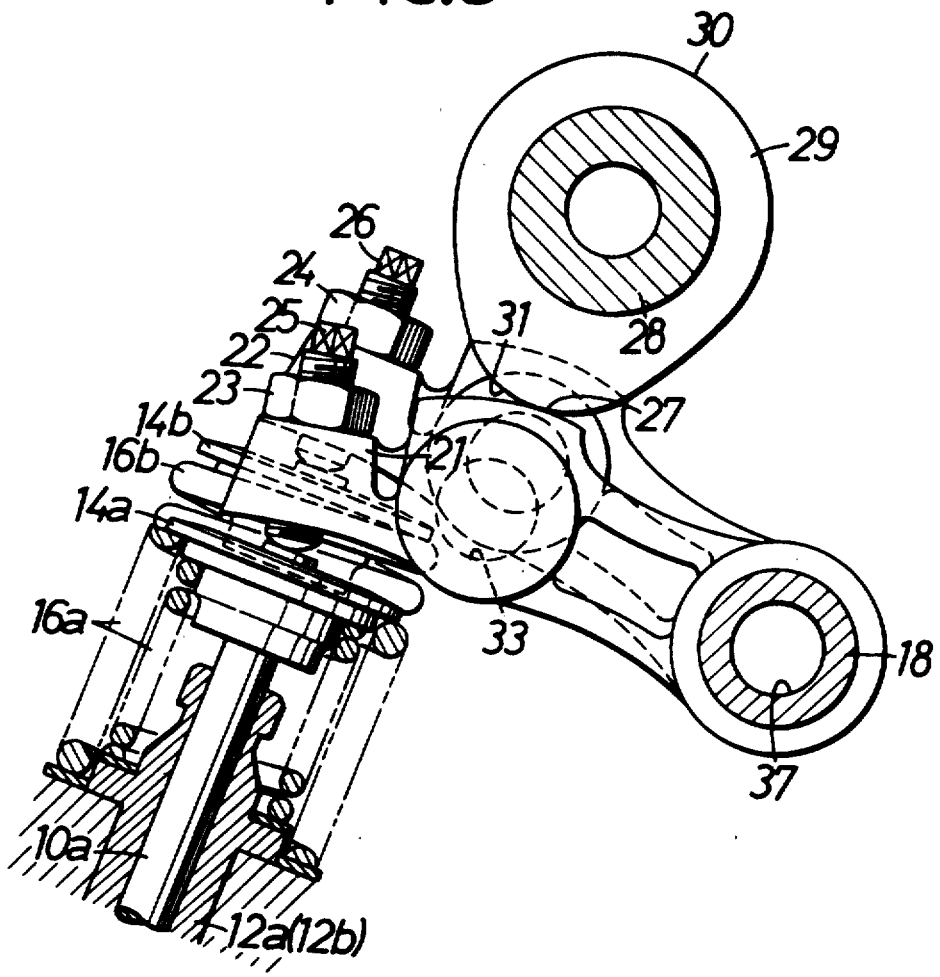
FIG. 5 is similar to FIG. 4 but shows the operation of the first rocker arm.

The operations of the embodiment thus far described will be explained in the following. Since the paired intake valves 10a and 10b and the paired exhaust valves 11a and 11b perform the similar operations, however, only the operations of the intake valves 10a and 10b will be explained in the following. First of all, when the engine r.p.m. does not reach a predetermined value yet, the actuator 70 is non-operative. As a result, the oil supply passage 37 has communication with the pressure oil outlet passage 58 through the oil pass pipe 54, the pressure oil distributing passage 56, the valve chamber 66 and the right valve bore portion 65, as shown in FIG. 2, so that no oil pressure is applied to the hydraulic actuation chamber 36 of the cylinder bore 33. As a result, the plunger 32 is held in the cylinder bore 33 by the force of the return spring 44 thereby to release the connected state of the first and second rocker arms 19 and 20. Thus, the first rocker arm 19 allows the intake valve 10a to rise thereby to close the inlet 6, when the lower cam portion 30 of the cam 29 is in sliding contact with the cam slipper 27, as shown in FIG. 4, but depresses the intake valve 10a thereby to open the inlet 6 when the higher cam portion 31 of the cam 29 comes into sliding contact with the cam slipper 27, as shown in FIG. 5. In these ways, the first rocker arm 19 rocks in accordance with the rotations of the cam 29 so that only one intake valve 10a is opened and closed. In this meanwhile, the other intake valve 10b is left stopped, and the abutting flange 43 of the guide pin 42 fitted in the guide bore 34 of the second rocker arm 20 is in sliding contact with the leading end face of the plunger 32 within the gap 47. As a result, even if only the first rocker arm 19 rocks, the leading ends of the plunger 32 and the guide pin 42 are not caught by the opened end edges of the guide bore 34 and the cylinder bore 33 so that those opened end edges, the plunger 32 and the guide pin 42 can be prevented without fail from being broken.

Figure 6:
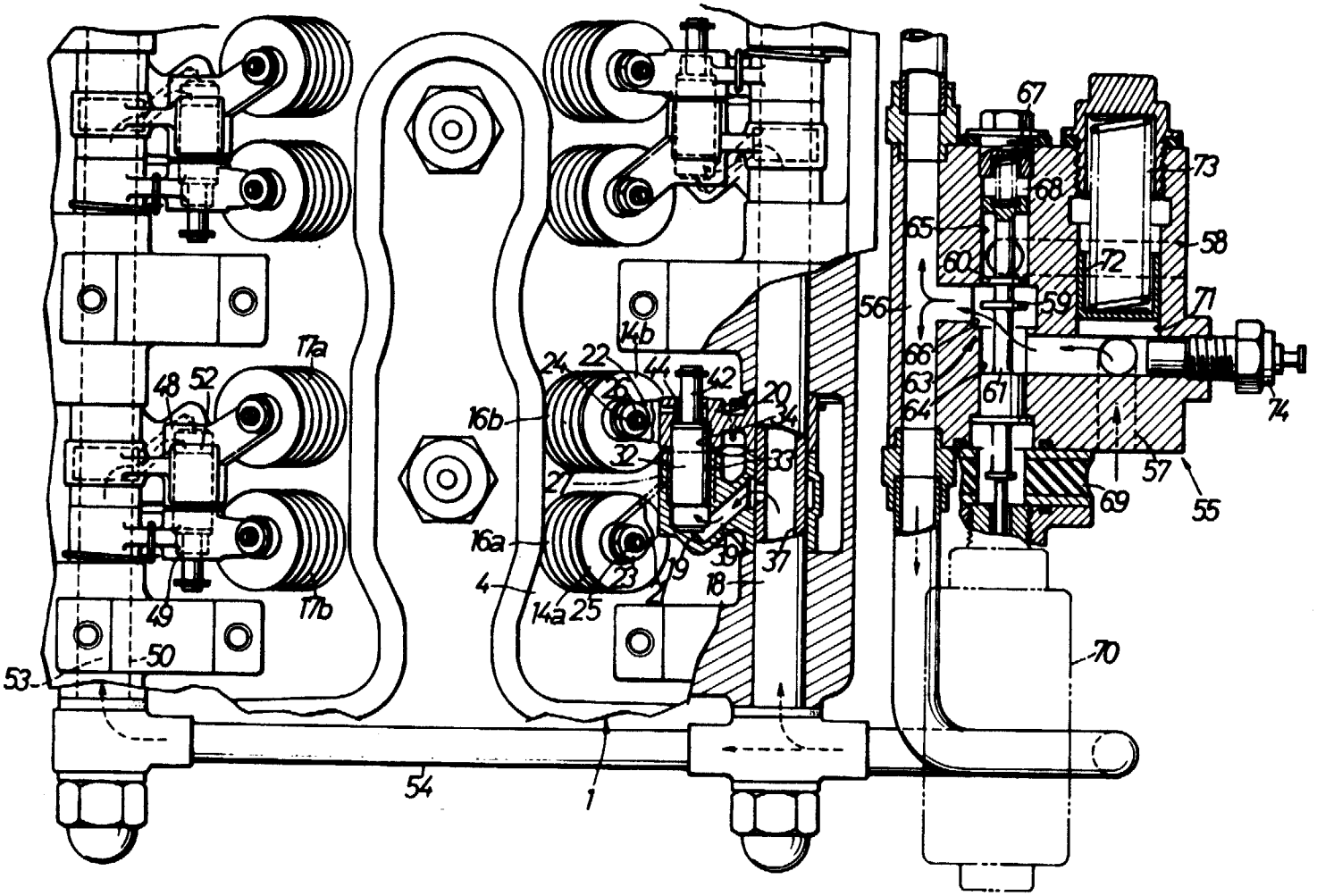
FIG. 6 is similar to FIG. 2 but shows the state in which the two rocker arms are connected.
Figure 7:
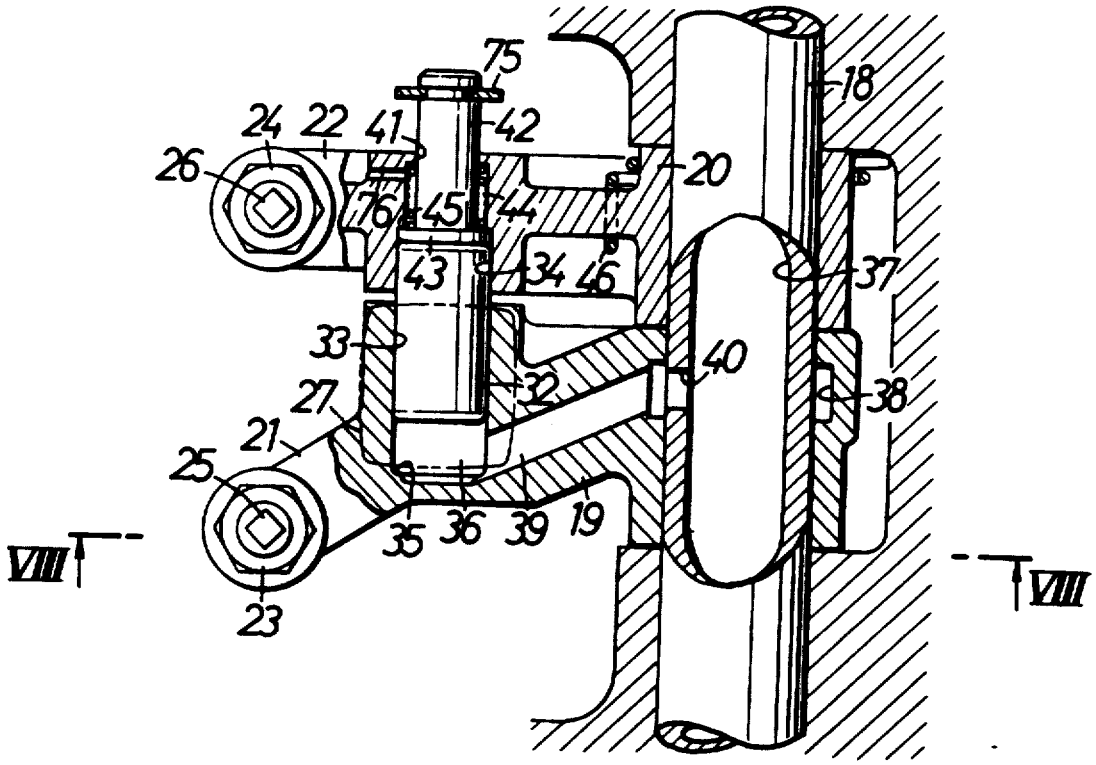
FIG. 7 is similar to FIG. 3 but shows the state in which the two rocker arms shown in FIG. 6 are connected.
Figure 8:
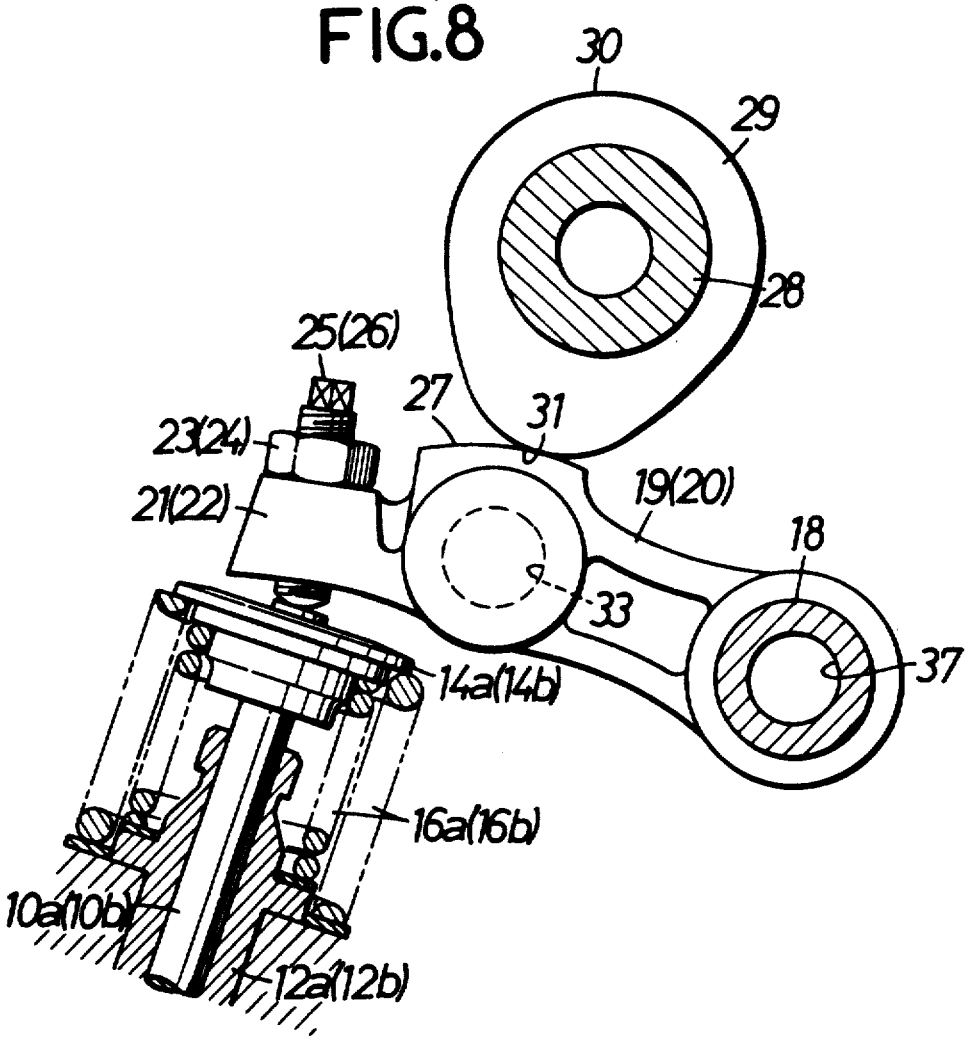
FIG. 8 is a section taken along line VIII—VIII of FIG. 7.

Turning to FIGS. 6, 7 and 8, it is assumed that engine r.p.m. exceeds a predetermined level and that the temperature of the pressure oil exceeds a predetermined level. In this case, the actuator 70 operates so that the valve stem 61 moves to provide communication of the valve chamber 66 with the left valve bore portion 64. As a result, the oil pressure is applied to the hydraulic actuation chamber 36 of the cylinder bore 33 of the first rocker arm 19. Thus, the plunger 32 is thrusted out against the force of the return spring 44. Since, at this time, the second rocker arm 20 is always positioned at the side of the intake valve 10b by the action of the set spring 46, the plunger 32 goes into the guide bore 34 while thrusting the guide pin 42, during a short time period for which the lower cam portion 30 of the cam 29 and the cam slipper 27 are in sliding contact with each other, until the abutting flange 43 comes into abutment against the stopper portion 45, thus integrating the first and second rocker arms 19 and 20. As a result, the first and second rocker arms 19 and 20 start their rocking motions together so that both the intake valves 10a and 10b are opened and closed in synchrinism with each other. As a matter of fact, incidentally, at the instant when the plunger 32 is slightly forced into the guide bore 34, the two rocker arms 19 and 20 start their integral rocking motions.

When the engine r.p.m. drops to become lower than the predetermined level, the operation of the actuator 70 is stopped. In response to this, the valve stem 61 is moved by the force of the spring 68 so that the left valve bore portion 64 is closed by the spool valve member 59 whereas the right valve bore portion 65 is opened. As a result, the oil supply passage 37 is made to communicate with the pressure oil outlet passage 58 to abruptly drop the oil pressure of the hydraulic actuation chamber 36 in the cylinder bore 33 so that the plunger 32 is forced into the cylinder bore 33 by the return spring 44 through the guide pin 42. As a result, the plunger 32 is thrusted by the guide pin 42 into the cylinder bore 33 during a minute time period for which the lower cam portion 30 of the cam 29 comes into sliding contact with the cam slipper 27 with the cylinder bore 33 and the guide bore 34 being aligned with each other so that the frictional force between the plunger 32 and the inner face of the guide bore 34 becomes weaker than the force of the return spring 44. This movement of the plunger 32 ends at the time when its rear end face abuts against the stepped portion 35, whereupon the abutting faces between the leading end face of the plunger 32 and the abutting flange 43 of the guide pin 42 are positioned in the gap 47 between the first and second rocker arms 19 and 20. Thus, the first and second rocker arms 19 and 20 are released from their connected states so that the first rocker arm 19 rocks in response to the rotations of the cam 29 whereas the second rocker arm 20 is held in the still state.

Incidentally, the returning movement of the plunger 32 into the cylinder bore 33 may not be completed within the slidably contacting period of the lower cam portion 30 with the cam slipper 27 during one rotation of the cam 29 in dependence upon the force of the return spring 44. However, even if the cam 29 rotates several times so that the returning movement of the plunger 32 is completed, a sense of incompatibility is not felt during the actual running operation of the vehicle because it is remarkably short for the cam 29 to rotate several times.

Thus, the intake valves 10a and 10b are changed in accordance with the r.p.m. of the engine between the state, in which both of them 10a and 10b are operating, and the state in which only one valve 10b is stopped. If, however, the position of the plunger 32, i.e., the position of the cylinder bore 33 is offset from the cam sleeve 27, the strain of the first rocker arm 19 at the always moving side is added to that of the second rocker arm 20 at the stopped side. As a result, the motions of the intake valve 10b are displaced from the theoretical ones based upon the profile of the cam 29 so that the intake valve 10b jumps or bounces at an r.p.m. quite lower than the theoretical one.

Figure 9A:
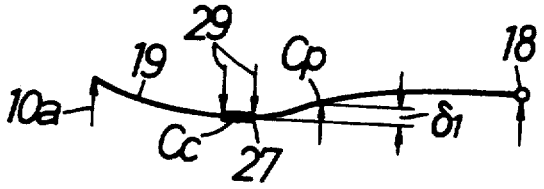
FIGS. 9A and 9B are diagrams illustrating relative strains in case a cam slipper and a cylinder bore are offset from each other.
Figure 9B:
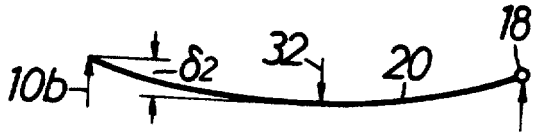

Here, it is assumed that the center Cp of the cylinder bore 33 is offset toward the support shaft 18 from the center Cc of the sliding range of the cam slipper 27 with the cam 29. In this case, a downward load is exerted upon the cam slipper 27 by the cam 29 such that the maximum load is applied to a position displaced to the right or left from the center Cc. As a result, a relative strain $\delta 1$ is established in the first rocker arm 19 between the center Cc of the cam slipper 27 and the center Cp of the cylinder bore 33. This relative strain $\delta 1$ causes the intake valve 10a to jump or bounce at an r.p.m. lower than the theoretical level. On the other hand, the second rocker arm 20 at the still side receives the downward load from the plunger 32, as shown in FIG. 9B, so that a relative strain $\delta 2$ is established between the intake valve 10b and the plunger 32. As a result, a relative strain of $(\delta 1+\delta 2)$ is established between the cam slipper 27 and the intake valve 10b so that the motions of the intake valve 10b are distorted from the theoretical motions.

Figure 10A:
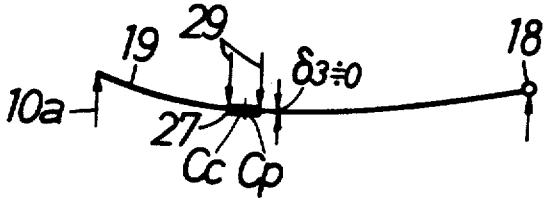
FIGS. 10A and 10B are similar to FIGS. 9A and 9B but illustrates the case in which the cam slipper is above the cylinder bore.
Figure 10B:
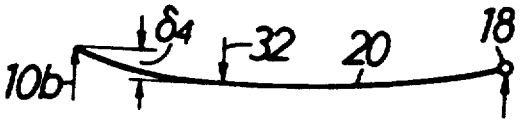

In the present embodiment, on the contrary, as shown in FIG. 10A, the center Cp of the cylinder bore 33 falls on the straight line joining the center of the cam shaft 28 and the center Cc of the cam slipper 27. Therefore, the loaded point of the cam slipper 27 and the center Cp of the cylinder bore 33 are very slightly spaced from each other, and a relative strain $\delta 3$ of the first rocker arm 19 between the center Cc of the cam slipper 27 and the center Cp of the cylinder bore 33 is substantially zero. At the second rocker arm 20 at the still side, on the other hand, the plunger 32 is positioned close to the intake valve 10b so that a relative strain $\delta 4$ between the intake valve 10b and the plunger 32 is smaller than that $\delta 2$ in the case of FIG. 9B. As a result, the relative strain of $(\delta 3+\delta 4)$ between the intake valve 10b and the cam slipper 27 is substantially euqal to $\delta 4$ so that it is far smaller than that in the case of FIG. 9B. Therefore, small influence by the strain of the first rocker arm 19 is exerted upon the second rocker arm 20 at the still side so that the motions of the intake valve 10b resemble the theoretical ones.

The positional relationship between the cam slipper 27 and the cylinder bore 33 is invariant no matter where the cam slipper 27 might be positioned in the first rocker arm 19. In order to minimize the relative strain $\delta 4$ of the second rocker arm 20, however, it is desirable that the cam slipper 27 be positioned close to the side of the intake valve 10a. Then, the distance between the intake valve 10b and the plunger 32 is reduced so that the relative strain $\delta 4$ becomes smaller and smaller. If, moreover, the center Cp of the cylinder bore 33 is laid on the straight line L joining the center Cc of the cam slipper 27 and the center of the cam shaft 28, the displacement of the contacting point between the cam 29 and the cam slip 27 from the center Cc is reduced, and that contacting point is displaced to the right and left from the center Cc. This is preferable because the relative strain $\delta 3$ can be held at a value substantially equal to zero on an average. However, the relative strain $\delta 3$ can be reduced if the cam slipper 27 is disposed above the cylinder bore 33.

In the embodiment thus far described, the first rocker arm 19 is formed with the cam slipper 27 so that it may be driven to rock by the sliding contact with the cam 29. Despite of this fact, the second rocker arm 20 may be formed with a cam slipper so that it may be used as an always moving side and may be driven to rock. In case the second rocker arm 20 is driven to rock, however, the first and second rocker arms 19 and 20 are made to have a substantially equal weight. In case the first rocker arm 19 is used as the always moving side as in the foregoing embodiment, on the contrary, the second rocker arm 20 can be made remarkably light so that the total weight of the first and second rocker arms 19 and 20 can be reduced. In case the second rocker arm 20 is formed with the slipper, on the other hand, the first rocker arm 19 is always positioned at the side of the intake valve 10a in the hydraulically changing operation so that the passage 39 and the communication passage 40 can be easily made to communicate while making unnecessary the annular groove 38 which is used to allow the offset between the passage 39 and the communication passage 40.

What is claimed is:

1. In an internal combustion engine of the type in which at least one pair of intake or exhaust valve having an identical function and disposed adjacent to each other are arranged for use with one cylinder, a valve actuating mechanism having a stopping function wherein: first and second rocker arms respectively having arms abutting against the upper ends of the paired intake or exhaust valves are rockingly supported on a common support shaft which is fixed on the engine body while having an axis perpendicular to the operating directions of said valves; said first rocker arm is formed with a cylinder bore which is opened toward said second rocker arm to bear a plunger therein whereas said second rocker arm is formed with a guide bore which is opened toward said first rocker arm to fit said plunger therein; a hydraulic actuation chamber defined between the bottom portion of said cylinder bore and the rear end of said plunger is connected with an oil pressure source through a hydraulic change-over valve for changing the supply and stop of the oil pressure to said actuation chamber; and either of said first or second rocker arm is formed with a cam slipper for sliding contact with a cam which is adapted to rotate in accordance with the run of said engine.

2. A valve actuating mechanism as set forth in claim 1, wherein said cam slipper is formed on said first rocker arm.

3. A valve actuating mechanism as set forth in claim 2, wherein said cam slipper is formed above said cylinder bore and on an upper portion of said first rocker arm.

4. A valve actuating mechanism as set forth in claim 1, wherein there is movably fitted in said guide bore a guide pin which is elastically biased to abut against said plunger, and wherein said guide bore is formed with both a stopper portion for regulating said guide pin from moving in a direction apart from said first rocker arm and an air vent hole for venting the portion between said guide pin and the bottom portion of said guide bore to the atmosphere.

5. A valve actuating mechanism as set forth in claim 1, wherein said cylinder bore is formed with a stepped portion which can abut against the rear end face of said plunger for defining said hydraulic actuation chamber between rear end face of said plunger and the bottom portion of said cylinder bore, wherein there is movably fitted in said guide bore a guide pin which is elastically biased to abut against said plunger, wherein said guide bore is formed with a stopper portion for regulating said guide pin from moving in a direction apart from said first rocker arm, and wherein there is formed between the opened ends of said cylinder bore and said guide bore a gap in which the abutting faces of said plunger and said guide are positioned when said plunger abuts against the stepped portion of said cylinder bore.

6. In an internal combustion engine of the type in which at least one pair of intake or exhaust valves having an identical function and disposed adjacent to each other are arranged for use with one cylinder, a valve actuating mechanism having a stopping function wherein: first and second rocker arms respectively having arms abutting against the upper ends of the paired intake or exhaust valves are rockingly supported on a common support shaft which is fixed on the engine body while having an axis perpendicular to the operating directions of said valves; said first rocker arm is formed with a cylinder bore which is opened toward said second rocker arm to bear a plunger therein whereas said second rocker arm is formed with a guide bore which is opened toward said first rocker arm to fit said plunger therein; a hydraulic actuation chamber defined between the bottom portion of said cylinder bore and the rear end of said plunger is connected with a hydraulic change-over valve for changing the supply and stop of the oil pressure from an oil-pressure source to said hydraulic actuation chamber through a passage formed in said first rocker arm, an oil supply passage formed concentrically in said support shaft, and a communication passage formed in said support shaft for providing communication between the former two passages; and either of said first or second rocker arm is formed with a cam slipper for sliding contact with a cam which is adapted to rotate in accordance with the run of said engine.

7. In an internal combustion engine of the type in which at least one pair of intake and exhaust valves having an identical function and disposed adjacent to each other are arranged for use with each cylinder, a valve actuating mechanism having a stopping function wherein: both first and second rocker arms forming a pair and respectively having arms abutting against the upper ends of the paired intake valves and first and second arms forming a pair and respectively having arms abutting against the upper ends of the paired exhaust valves are rockingly supported, respectively, on a pair of support shafts which are fixed at the intake valve side and at the exhaust valve side of the engine body, respectively, while having axes perpendicular to the operating directions of the respective valves; said first rocker arms are respectively formed with cylinder bores which are opened toward the corresponding second rocker arms to bear plungers therein whereas said second rocker arms are respectively formed with guide bores which are opened toward the corresponding first rocker arms to fit said plungers therein; hydraulic actuation chambers defined between the bottom portions of said cylinder bores and the rear ends of said plungers are connected with a single hydraulic change-over valve for changing the supply and stop of the oil pressure from a single oil-pressure source to said hydraulic actuation chambers through passages formed respectively in said first rocker arms, oil supply passages formed respectively and concentrically in said support shafts, and communication passages formed respectively in said support shafts for providing communications between the former two passages; and either said first rocker arms or second rocker arms are formed with cam slippers for sliding contact with cams which are adapted to rotate in accordance with the run of said engine.

*8. In an internal combustion engine having a cylinder, intake or exhaust valve means for use in said cylinder, and cam means adapted to rotate in accordance with the run of said engine for imparting a mode of operation to said valve means, a valve actuating mechanism, comprising:*

*first and second valve moving means disposed adjacent each other and operably located intermediate said cam means and said valve means for transmitting one mode of operation from said cam means to said valve means when said valve moving means are connected and another mode of operation from said cam means to said valve means when said valve moving means are disconnected;*

*said first valve moving means being formed with a cylinder bore which is opened toward said second valve moving means to bear a plunger therein whereas said second valve moving means is formed with said guide bore which is opened toward said first valve moving means to fit said plunger therein;*

*a hydraulic actuation chamber defined between the bottom portion of said cylinder bore and the rear end of said plunger and connected with an oil pressure source through a selectively actuable hydraulic pressure supply means for controlling the supply of oil pressure to said actuating chamber to selectively move said plunger into and out of connected relation between said cylinder bore and said guide bore; and*

*at least one of said first and second valve moving means being formed with a cam slipper for sliding contact with said cam means.*

*9. The valve actuating mechanism of claim 8 wherein the bores in said first and second valve moving means are perpendicular to the direction of movement of said valve means.*

*10. The valve actuating mechanism of claim 8 wherein said oil pressure supply means includes a changeover valve for either supplying or stopping the oil pressure.*

*11. The valve actuating mechanism of claim 8 wherein said valve actuating mechanism includes biasing means urging said plunger in a direction to discharge oil from said actuating chamber for disconnecting the first and second movable means.*

*12. In an internal combustion engine having a cylinder, intake or exhaust valve means for use in said cylinder, and cam means adapted to rotate in accordance with the run of said engine for imparting a mode of operation to said valve means, a valve actuating mechanism, comprising:*

*first and second rocker arms pivotably supported on a common support shaft having an axis substantially perpendicular to the operating direction of said valve means, said first and second rocker arms operably connecting said valve means to impart one mode of operation thereto when said rocker arms are connected and another mode of operation when said rocker arms are disconnected;*

*said first rocker arm being formed with a bore which is open toward said second rocker arm and said second rocker arm being formed with a bore which is open toward said first rocker arm;*

*plunger means movably positioned in at least one of said bores and having means for selectively extending into both of said bores for connecting said rocker arms;*

*a hydraulic actuation chamber formed in one of said bores intermediate a bottom portion thereof and said plunger means and being connected to an oil pressure source having means for changing the supply of oil pressure to said actuation chamber for selectively moving said plunger means to connect and disconnect said rocker arms; and*

*said cam means including a camshaft and a cam mounted for rotation on said camshaft and said first rocker arm having means in engagement with said cam to effect pivotal movement of said first rocker arm.*

*13. The valve actuating mechanism of claim 8 wherein said plunger is slidably mounted in said first valve moving means and a guide pin is slidably mounted in said second valve moving means.*

*14. The valve actuating mechanism of claim 13 wherein said plunger has an end and surface engaging an end surface on the guide pin, and said end surfaces are located between said first and second valve moving means in the disconnected position.*

*15. The valve actuating mechanism of claim 14 wherein spring biasing means continually urge said plunger and guide pin toward the disconnected position.*

*16. The valve actuating mechanism of claim 15 wherein said spring biasing means engages and urges said guide pin toward said plunger, and said hydraulic actuation chamber means is formed at an end of the plunger away from the guide pin.*

*17. The valve actuating mechanism of claim 14 wherein said end surfaces of said plunger and guide pin remain in sliding contact during relative movement of the first and second valve moving means.*

*18. The valve actuating mechanism of claim 12 wherein both the first and second rocker arms extend in the same lateral direction from the support shaft and engage said valve means and said cam on the same longitudinal side of the rocker arm.*

*19. The valve actuating mechanism of claim 18 wherein the sliding engagement between the first rocker arm and the cam is at substantially the same distance from the support shaft as the location of a center of the bores and plunger means.*

*20. The valve actuating of claim 12 wherein said first and second rocker arms are adjacent each other and a small gap is provided therebetween at the location of the bores.*

*21. The valve actuating mechanism of claim 20 wherein said plunger means includes a plunger in one of said bores and a guide pin in the other of said bores with said plunger and guide pin having abutting surfaces located in said gap when the first and second rocker arms are disconnected.*

*22. The valve actuating mechanism of claim 21 wherein said plunger and guide pin abutting faces are of a size for maintaining sliding abutting relationship therebetween throughout pivotal movement of the first rocker arm by the cam when the first and second rocker arms are disconnected.*

*23. The valve actuating mechanism of claim 21 or 22 wherein said plunger is slidable to a position within both bores for connecting said first and second rocker arms.*

*24. The valve actuating mechanism of claim 21 or 22 wherein the hydraulic actuating chamber is formed between a rear end portion of the plunger and one of said bores.*

*25. The valve actuating mechanism of claim 21 or 22 wherein said plunger means includes means for resiliently biasing said guide pin toward said plunger, and means for preventing movement of said guide pin in response to said biasing means beyond the location where the abutting surfaces are in said gap.*

*26. The valve actuating mechanism of claim 25 wherein said biasing means is a coil spring coaxial with the guide pin in the same rocker arm as the guide pin and said means for preventing movement includes means on said guide pin engaging said same rocker arm.*

*27. The valve actuating mechanism of claim 12, 18, 19, 20, 21 or 22 wherein means includes a pair of either intake*

*or exhaust valves for one cylinder, said first and second rocker arms each engaging one valve of a said pair of valves for separately operating said valves, the means on said first rocker arm in engagement with the cam being located and centered on a line perpendicular to the support shaft substantially midway between the two valves of said pair of valves.*

*28. The valve mechanism of claim 27 wherein the engagement between the first rocker arm and the cam is at substantially the same distance from the support shaft at the location of a center of the bores and plunger means.*

*29. The valve actuating mechanism of claim 12, 18, 19, 20, 21 or 22 wherein the sliding engagement between the first rocker arm and the cam is at substantially the same distance from the support shaft as the location of a center of the bores and plunger means.*

*30. The valve actuating mechanism of claim 12, 18, 19, 20, 21 or 22 wherein the bores in said rocker arms are parallel to the support shaft.*

* * * * *